United States Patent

Markle

[15] 3,641,344
[45] Feb. 8, 1972

[54] SOLAR-STIMULATED FLUORESCENT RADIATION DETECTION METHOD AND APPARATUS

[72] Inventor: David A. Markle, Wilton, Conn.

[73] Assignee: The Perkin-Elmer Corporation, Norwalk, Conn.

[22] Filed: Apr. 1, 1969

[21] Appl. No.: 811,738

[52] U.S. Cl..................................250/71, 250/83.3, 356/96
[51] Int. Cl. ......................................................G01n 21/34
[58] Field of Search...............250/71, 83.3 UV; 356/96, 97

[56] References Cited

UNITED STATES PATENTS 3,327,117  6/1967  Kamentsky.....................250/83.3 UV
3,497,690  2/1970  Wheeless, Jr. et al....................250/71

Primary Examiner—Archie R. Borchelt
Attorney—Edward R. Hyde, Jr.

[57] ABSTRACT

A method and apparatus for determining the presence, location and relative concentration of certain fluorescent materials in a scene that is illuminated by sunlight. The particular fluorescent materials are characterized in that they fluoresce at wavelengths coincident with one or more Fraunhofer absorption bands. Two images are formed from light collected from the scene. One of the images consists mainly of light from the scene having a spectral band-pass inside a Fraunhofer absorption band and the other image consists mainly of light from the scene having a spectral band-pass in the continuum near the same Fraunhofer absorption band. The two images are normalized so that intensities on corresponding portions of each image due to reflected solar radiation are equal. The "continuum" image is then subtracted from the "Fraunhofer" image. The resulting difference image consists primarily of fluorescent radiation derived from the fluorescent materials or objects in the scene and provides a direct visual indication of their presence, location and relative concentration.

9 Claims, 3 Drawing Figures

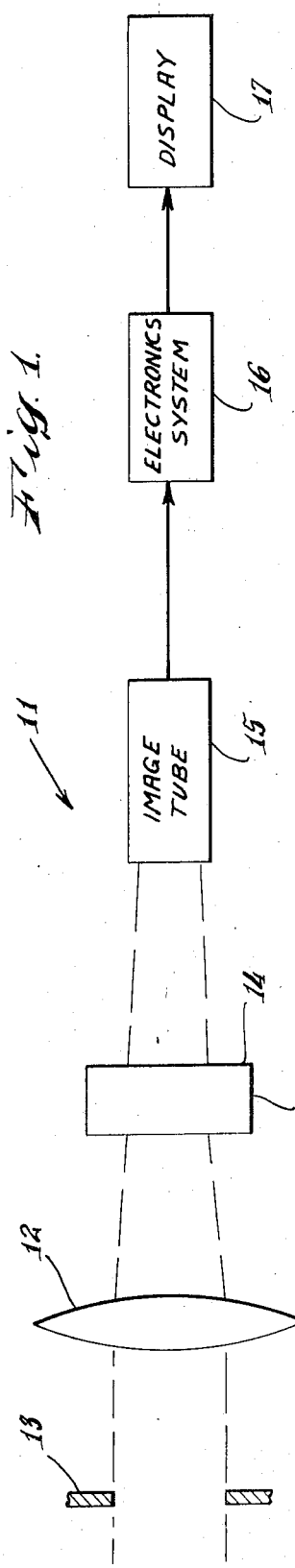
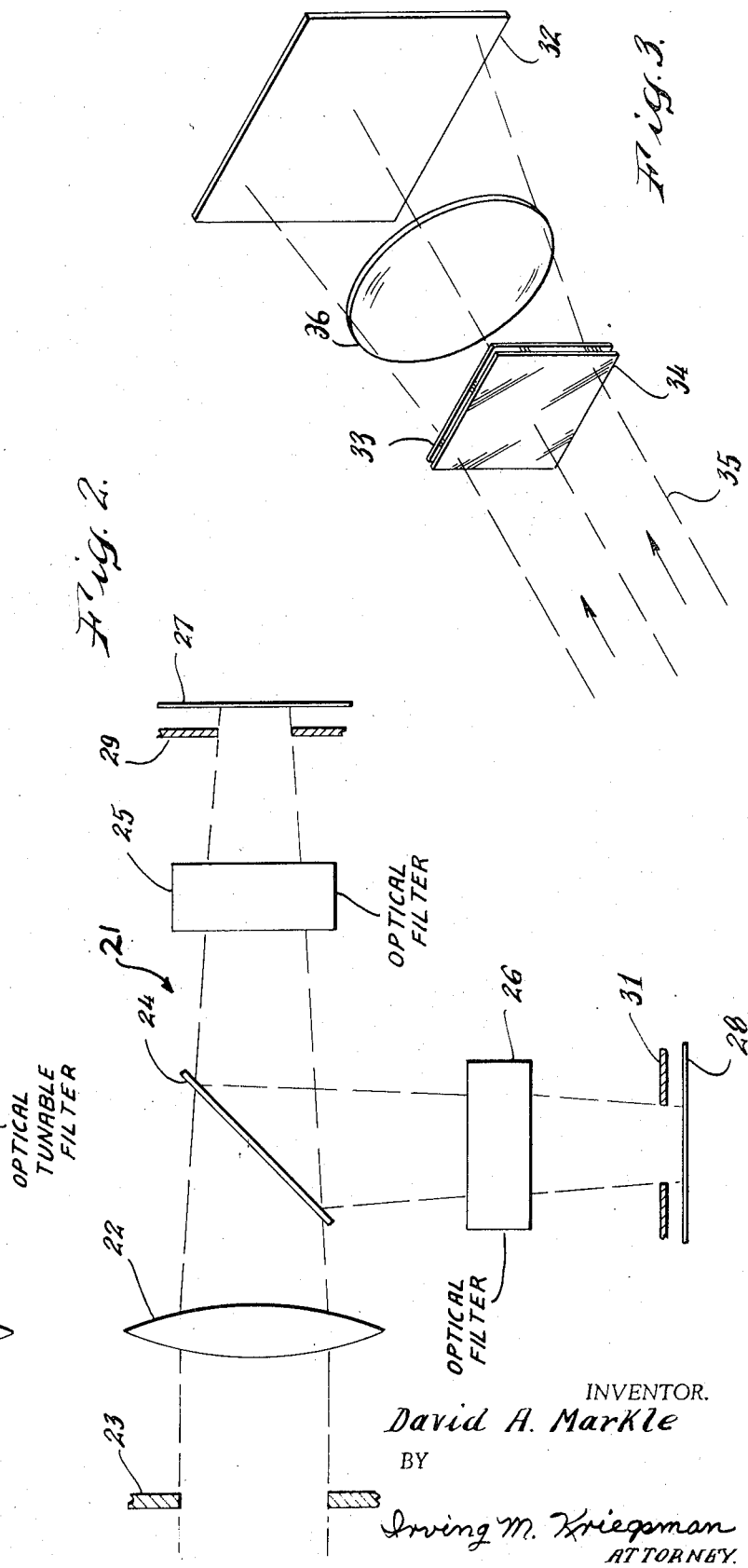

SOLAR-STIMULATED FLUORESCENT RADIATION DETECTION METHOD AND APPARATUS

This invention relates to a method and apparatus for detecting certain fluorescent objects or materials in a scene of interest in sunlight. More particularly, this invention relates to a method and apparatus for determining the presence, location and concentration in a scene of interest illuminated by sunlight of certain fluorescent objects or materials by detecting the solar-stimulated fluorescent radiation emitted by the objects or materials.

In my copending patent application, Ser. No. 760,834 filed on Sept. 19, 1968 and assigned to the assignee of this application, there is disclosed a method and apparatus for examining a scene of interest and detecting the presence and relative concentration in the scene of solar-stimulated fluorescent radiation. The method and apparatus disclosed in my copending application are based on the known principle that certain fluorescent materials fluoresce at wavelength bands which are coincident with certain sharply defined Fraunhofer absorption lines in the solar spectrum. When sunlight is reflected off a nonfluorescent material, some wavelengths tend to be reflected more than others; however, the variation of reflectivity with wavelength is relatively smooth and consequently the deep Fraunhofer lines are retained in the reflected component. The same is not true of fluorescent materials which are characterized by a strong absorption in one spectral region immediately followed by reemission at longer wavelengths. The reemission process completely removes the sharp Fraunhofer lines yielding a relatively smooth emission spectrum. Any addition of a fluorescence spectrum to a reflected spectrum therefore tends to reduce the relative depth of the Fraunhofer absorption lines occurring at the fluorescence emission peak. In my copending application, the intensity of direct sunlight and the intensity of sunlight reflected off a scene of interest is measured over two wavelength bands, one of the two wavelength bands being inside a preselected Fraunhofer absorption band and the other wavelength band being a few angstroms away from the preselected Fraunhofer absorption band in the continuum. Using these four intensity signals, a single signal corresponding to fluorescivity is produced.

Although the apparatus disclosed in my copending application is quite useful in most applications, it is somewhat limited in that it only produces a signal indicating the presence and amount of fluorescent radiation emitted over the entire scene being viewed. It does not provide an indication of where the fluorescent materials are located in the scene and does not indicate variations in fluorescivity over different portions of the scene. The size of the scene viewed by the apparatus is dependent on the field of view of the optics in the apparatus used to collect light from the scene, and also on the distance from the optics to the scene. If the optics is a relatively large distance from the scene, the size of the scene that is viewed will be correspondingly large. Thus, it is evident that for certain applications, such as prospecting for fluorescent materials from a highflying aircraft, more is needed than simply an indication of fluorescivity in the scene.

Accordingly, it is an object of this invention to provide a new and improved method and apparatus for detecting fluorescent radiation.

It is another object of this invention to provide a new and improved method and apparatus for determining the presence, location and relative concentration of certain fluorescent materials or objects in a scene of interest using sunlight to stimulate the materials or objects to fluoresce.

It is still another object of this invention to provide a new and improved method and apparatus for detecting fluorescent radiation in which use is made of the coincidence of certain Fraunhofer absorption bands and the characteristic wavelength emission bands of certain fluorescent materials.

The above and other objects are achieved according to this invention by providing a method and apparatus for forming an image of a scene consisting solely of solar-stimulated fluorescent radiation. The technique for forming the "fluorescent" image involves forming two separate images of the scene, which is illuminated by sunlight, one of the images consisting solely of light from the scene over a wavelength band inside a preselected Fraunhofer absorption band and the other image consisting solely of light from the scene near the same Fraunhofer absorption band in the continuum, normalizing the two images and then subtracting the "continuum" image from the "Fraunhofer" image. The difference image contains only solar-stimulated fluorescent radiation and is thus a "fluorescent" image. The Fraunhofer and continuum images may be formed at the same time or consecutively. In one version of the invention, the Fraunhofer and continuum images are normalized and subtracted from each other using film. In another version of the invention, the Fraunhofer and continuum images are normalized and subtracted from each other electro-optically.

In the drawings,

FIG. 1 is a schematic view of one embodiment of the invention;

FIG. 2 is a schematic view of another embodiment of the invention; and

FIG. 3 is a schematic view showing how the fluorescent image produced in the embodiment shown in FIG. 2 is displayed.

Referring now to the drawings, there is shown in FIG. 1 an embodiment of the invention.

The apparatus 11 includes an objective lens 12 and an entrance pupil 13. The objective lens 12 and the entrance pupil 13, which is positioned one focal length in front of the objective lens 12, together form a telecentric optical system. Positioned behind the lens 12 is a filter 14. Filter 14 has a transmission peak centered on a preselected Fraunhofer absorption band and a transmission passband about the same width or smaller than the bandwidth of the preselected Fraunhofer absorption band. Additionally, filter 14 is selectively tunable so that the transmission passband can be shifted from inside the Fraunhofer absorption band to the continuum. Positioned behind the filter 14 in the image plane of objective lens 12 is an image tube 15, such as a vidicon. Light collected by the objective lens 12 and passed by the filter 14 is imaged on the image tube 15. In the image tube 15, the optical image formed on its light sensitive surface is converted into an "electrical image" that is, a "pattern" of electrical signals. As the transmission peak on the filter 14 shifts, the relative brightness of the image formed on the image tube 15 changes correspondingly. The image tube 15 is connected to an electronic system 16 which includes a computer. In the electronic system 16, the two electrical images, one corresponding to the optical image when the filter 14 is centered inside the preselected Fraunhofer absorption band and the other corresponding to the optical image when the filter 14 is centered in the continuum near the preselected Fraunhofer absorption band, are normalized and combined into a single image by subtracting the "continuum" image from the "Fraunhofer" image. The resulting pattern of electrical signals or "electrical image" corresponds to the solar-stimulated fluorescent radiation in the scene. The resulting electrical image is converted into a viewable "fluorescent" image by means of a display device 17, such as an oscilloscope or television receiver which is connected to the output of the electronic system 16.

In use, the telecentric optical system is directed toward a scene which is to be examined. The scene is illuminated by direct sunlight. Light collected from the scene is filtered, imaged, converted into electrical signals and then converted into a fluorescent image on a suitable display device. The transmission peak and passband width of the filter 14 depend on the particular fluorescent material being sensed. For example, if the apparatus is being used to sense Rhodamine B, which fluoresces at the Fraunhofer absorption band at 5,890 A, filter 14 should be designed to peak at 5,890 A and have a transmission passband width about equal to the 5,890 A Fraunhofer absorption bandwidth which is about 0.7 A.

The normalization of the two original images need not be performed in the electronic system as described in the FIG. 1 embodiment, but may, as an alternative arrangement, be performed internally in the image receiving tube.

Any type of optical filter having the design characteristics described above and which is selectively tunable may be used for filter 14. For example, filter 14 may be a narrow band, Fabry-Perot, air spaced, interference filter automatically and selectively tunable by changing the pressure of the gas in the air space. Such a filter is well known in the art.

Referring now to FIG. 2, there is shown another embodiment of the invention. As can be seen, the apparatus 21 includes an objective lens 22 and an entrance pupil 23 arranged to form a telecentric optical system as in the FIG. 1 embodiment. However, rather than forming the Fraunhofer and continuum images consecutively by means of a single tunable filter and then forming the fluorescent image electro-optically, in the FIG. 2 embodiment the Fraunhofer and continuum images are recorded on film at the same time and normalized and subtracted using photographic techniques. Thus, the apparatus further includes a beam splitter 24 for dividing the light beam into two beam parts or channels, separate nontunable filters 25, 26 in each channel, separate lengths of film 27, 28 for recording the image of light passed by filters 25, 26 and shutters 29, 31 in front of each length of film. One of the filters 25 is centered on the preselected Fraunhofer absorption band and the other filter 26 is centered in the continuum. The pictures formed on each length of film 27, 28 are normalized such as by adjusting the exposure time or developing time. The fluorescent (subtracted) image is produced by converting one of the pictures into a positive 33 and the other into a negative 34 (FIG. 3) using known photographic processes (not shown), and then directing a beam of light 35 through both the positive 33 and the negative 34. By means of a lens 36, positioned between the pictures and the screen 32, the fluorescent image may be projected onto the screen 32.

As is evident, the fluorescent image so produced by this invention provides a direct indication of where fluorescent materials or objects are located in a scene being examined and the brightness of the image is proportional to the relative concentration of the fluorescent materials or objects.

It is to be noted that the single, tunable filter, consecutive image forming arrangement shown in FIG. 1, can be modified along the lines of the FIG. 2 embodiment by adding a beamsplitter, using two nontunable filters instead of one tunable filter and two image tubes instead of one image tube. Similarly, the two-channel arrangement in FIG. 2 can be modified by eliminating the beam splitter, using one tunable filter instead of two nontunable filters and moving a length of film into position to record each image separately. Also, it should be noted that the photographic images on the light-sensitive film can be converted into electric signals and processed as in FIG. 1 embodiment.

In all embodiments, normalization may be achieved in a variety of ways such as by calibration with known targets or by selecting portions of the scene known to contain no fluorescence and therefore required to cancel in subtraction.

The apparatus may be used on the ground or may be mounted on an airplane or vehicle in space. Some of the uses for the apparatus include finding and tracing artificial fluorescent compounds used in rescue and water flow studies, detecting fluorescent minerals and detecting and tracing fluorescent pollutants such as oils and detergents.

I claim:

1. A method of producing an image of a scene illuminated by sunlight consisting solely of fluorescent objects or materials in the scene which fluoresce at wavelengths coincident with a particular Fraunhofer absorption band comprising the steps of:
   a. forming a first image of the scene consisting solely of light collected from the scene at a wavelength band inside the particular Fraunhofer absorption band;
   b. forming a second image of the scene consisting solely of light collected from the scene at a wavelength band in the continuum near the Fraunhofer absorption band;
   c. normalizing the two images for a first image of a scene portion in which objects or materials that fluoresce at the wavelength band within said particular Fraunhofer absorption band are not present;
   d. subtracting one image from the other; and
   e. displaying the resulting subtracted image; whereby the resulting subtracted image will consist solely of fluorescent objects or materials in the scene which fluoresce at the particular Fraunhofer absorption band.

2. The method according to claim 1 and wherein the two images are normalized and subtracted from each other electrically.

3. The invention according to claim 1 and wherein the two images are normalized and subtracted from each other photographically.

4. Apparatus for detecting the presence, location and relative concentration of fluorescent material in a scene of interest that is illuminated by sunlight, said fluorescent material having a fluorescence emission coincident with a known Fraunhofer absorption band comprising:
   a. means for collecting light from the scene and forming therefrom two images, a first image comprising light collected from the scene at a wavelength band inside the known Fraunhofer absorption band and a second image comprising light from the scene at a wavelength band in the continuum near the Fraunhofer absorption band;
   b. means for normalizing the two images for a first image of a scene portion in which objects or materials that fluoresce at the wavelength band within said particular Fraunhofer absorption band are not present;
   c. means for subtracting one image from the other image; and
   d. means for viewing the subtracted image, whereby the subtracted image will contain only solar-stimulated fluorescent radiation derived from the scene.

5. Apparatus for use in forming an image of a solar-illuminated scene consisting solely of solar-stimulated fluorescent radiation at a wavelength band coincident with a known Fraunhofer absorption band comprising:
   a. means for forming two images of the scene, one of the images consisting mainly of light collected from the scene over a wavelength band inside the Fraunhofer absorption band and the other consisting mainly of light collected from the scene at a wavelength band near the Fraunhofer absorption band in the continuum;
   b. image tube means for recording each one of the two images;
   c. electronic means connected to the image tube means for normalizing the two images and then subtracting one image from the other; and
   d. electro-optical display means connected to the electronics for visually displaying the resulting subtracted image, said resulting subtracted image consisting mainly of solar-stimulated fluorescent radiation emitted by the scene.

6. Apparatus for producing recorded images of a scene illuminated by sunlight from which an image corresponding to certain fluorescent materials in the scene can be produced comprising:
   a. means for forming an image of the scene containing only light from the scene at a wavelength band inside a Fraunhofer absorption band coincident with the characteristic wavelength of a certain fluorescent material;
   b. means for forming an image of the scene containing only light from the scene at a wavelength band in the continuum near said Fraunhofer absorption band; and
   c. light-sensitive film means for recording each of the two images.

7. Apparatus for producing an image of a scene illuminated by sunlight consisting solely of fluorescent objects or materials in the scene having a emission wavelength coincident with a particular Fraunhofer absorption band comprising:
  a. an image forming optical system for collecting light from the scene;
  b. an image tube for receiving the image from the image forming optical system and converting the image into a pattern of electrical signals;
  c. a narrow band tunable filter positioned between the image forming optical system and the image tube, said narrow band tunable filter being selectively tunable so as to be centered on the particular Fraunhofer absorption band and a few angstroms away from the particular Fraunhofer absorption band in the continuum, and having a transmission passband width no greater than the Fraunhofer absorption band;
  d. an electronic system connected to the receiving tube for receiving the pattern of electrical signals corresponding to the image when the filter is centered on the Fraunhofer absorption band and the pattern of electrical signals corresponding to the image when the pattern is centered on the continuum near the Fraunhofer absorption band, normalizing the two patterns of electrical signals and subtracting one pattern of signals from the other pattern of signals; and
  e. a display device connected to the electronic console means for producing an optical image corresponding to the resulting subtracted image.

8. Apparatus for producing two images of a scene illuminated by sunlight from which an image consisting solely of fluorescent objects or materials in the scene having a characteristic wavelength coincident with a particular Fraunhofer absorption band can be produced comprising:
  a. an image forming optical system for receiving light from the scene;
  b. a beam splitter for dividing the light emerging from the image forming optical system into two separate beams;
  c. a filter disposed along each beam path, one of the filters being centered on the particular Fraunhofer absorption band and having a bandwidth no greater than the particular Fraunhofer absorption band and the other filter being centered in the continuum near the particular Fraunhofer absorption band; and
  d. a length of photographic film for recording each filtered image.

9. The invention according to claim 8 and wherein the particular Fraunhofer absorption band is at 5,890 A and whereby the apparatus may be used for sensing the fluorescent material Rhodamine B.

* * * * *